(12) United States Patent
Liu et al.

(10) Patent No.: US 11,608,280 B2
(45) Date of Patent: Mar. 21, 2023

(54) ELECTRICAL WATER FILTER DEVICE

(71) Applicant: EEnotech, Inc., Sunnyvale, CA (US)

(72) Inventors: Bofei Liu, Palo Alto, CA (US);
Yuanqing Li, Santa Clara, CA (US);
Sidi Huang, San Jose, CA (US); Yi Cui, Stanford, CA (US)

(73) Assignee: EnnoPure, Inc., Sunnyvale, CA (US)

( * ) Notice: Subject to any disclaimer, the term of this patent is extended or adjusted under 35 U.S.C. 154(b) by 198 days.

(21) Appl. No.: 16/660,645

(22) Filed: Oct. 22, 2019

(65) Prior Publication Data

US 2021/0114899 A1    Apr. 22, 2021

(51) Int. Cl.
*C02F 1/461* (2006.01)

(52) U.S. Cl.
CPC ...... *C02F 1/46109* (2013.01); *C02F 2001/46161* (2013.01); *C02F 2303/04* (2013.01)

(58) Field of Classification Search
CPC ........ C02F 1/46109; C02F 2001/46161; C02F 2303/04; C02F 1/4691; C02F 1/42; C02F 2103/08; C02F 2103/10; C02F 2103/365; C02F 1/469; C02F 1/4695; C02F 2201/4617; C02F 1/46104–2001/46171
See application file for complete search history.

(56) References Cited

U.S. PATENT DOCUMENTS

| | | | |
|---|---|---|---|
| 3,623,969 A | 11/1971 | Hushihara | |
| 3,923,629 A * | 12/1975 | Shaffer | C02F 1/46109 204/260 |
| 4,160,711 A * | 7/1979 | Nishizawa | B01D 17/06 205/756 |
| 9,551,076 B2 * | 1/2017 | Buschmann | C25B 1/34 |
| 10,850,994 B2 * | 12/2020 | Cam | C02F 1/46109 |
| 2008/0073288 A1 * | 3/2008 | Fan | C02F 1/4691 204/554 |
| 2008/0073672 A1 | 4/2008 | Atlas | |
| 2008/0078672 A1 * | 4/2008 | Atlas | C02F 1/469 204/275.1 |
| 2018/0249737 A1 * | 9/2018 | Kim | A23L 3/26 |

FOREIGN PATENT DOCUMENTS

| | | | | |
|---|---|---|---|---|
| CN | 106637280 B | * | 9/2018 | |
| CN | 208948909 U | * | 6/2019 | |
| CN | 110436575 A | * | 11/2019 | |
| EP | 3608008 A1 | * | 2/2020 | C02F 1/003 |
| KR | 20210030012 A | * | 3/2021 | |
| RU | 2624695 C1 | | 7/2017 | |
| WO | WO-2012150466 A1 | * | 11/2012 | C02F 1/003 |
| WO | WO-2013036838 A2 | * | 3/2013 | C02F 1/4672 |

OTHER PUBLICATIONS

CN-208948909-U—English translation (Year: 2019).*
KR-20210030012-A—English translation (Year: 2021).*
CN-106637280-B—English translation (Year: 2018).*
CN-110436575-A—English translation (Year: 2019).*
International Search Report and Written Opinion for PCT/US2020/056704 dated Jan. 21, 2021, 9 pages. Only 6 pages.

\* cited by examiner

*Primary Examiner* — Alexander W Keeling (57) ABSTRACT

An electrical water filter device includes a plurality of porous electrodes and one or more porous separators. Each of the one or more porous separators is interposed between two adjacent porous electrodes. A respective porous electrode includes a connection portion extending outside an edge of a porous separators next to the respective porous electrode.

14 Claims, 13 Drawing Sheets

ELECTRICAL WATER FILTER DEVICE

BACKGROUND

The removal of bacteria and other harmful organisms from water is an important process, not only for drinking and sanitation but also for industrial applications as biofouling is a commonplace and serious problem. Conventional methods for water sterilization include chlorination and membrane-based approaches. Unfortunately, both of these types of approaches suffer from certain deficiencies.

Chlorination is typically a slow process, involving incubation times up to an hour or more to allow chlorine species to adequately dissipate through water to be treated. Also, chlorination can yield hazardous oxidation byproducts, including carcinogenic species, and chlorination equipment can be capital intensive, both from the standpoint of deployment and maintenance.

Conventional membrane-based approaches typically operate based on size exclusion of bacteria, which can involve a high pressure drop across a membrane and clogging of the membrane. Moreover, conventional membrane-based approaches can be energy intensive, and can suffer from low flow rates across a membrane.

A more efficient, effective, and environmentally-friendly water sterilization device is in demand.

SUMMARY

Described herein are electrical water filter devices and components for forming electrical water filter devices.

In one aspect, the disclosure describes an electrical water filter device. The electrical water filter device includes a plurality of porous electrodes and one or more porous separators. Each of the one or more porous separators is interposed between two adjacent porous electrodes. A respective porous electrode includes a connection portion extending outside an edge of a porous separators next to the respective porous electrode.

In some embodiments, the electrical water filter device further includes a case surrounding the porous electrodes and the one or more porous separators to fix the porous electrodes and the one or more porous separators in the case. In some embodiments, the case includes an electric connector extending from an inside of the case where the porous electrodes and the one or more porous separators are disposed to an outside of the case. The electric connector is connected to the connection portion of the respective porous electrode.

In some instances, the case includes an upper portion and a lower portion. At least one of the upper portion or the lower portion includes a port to receive the connection portion of the respective porous electrode and the electric connector of the case.

In some embodiments, the upper portion and the lower portion include a fastening mechanism to fasten each other together. For example, the fastening mechanism include threads on the upper portion and the lower portion. In some embodiments, the fastening mechanism include one or more snap buckles and one or more buckle receivers to engage the upper portion to the lower portion. In some embodiments, the fastening mechanism include one or more bolts and one or more nuts to engage the upper portion to the lower portion.

In some embodiments, each of the upper portion and the lower portion includes a plurality of through holes to allow water to flow through. In some embodiments, the upper portion of the case includes a wall extending upward to receive the water.

In some embodiments, the case further includes a sealing member interposed between the upper portion and the lower portion. In some embodiments, one of the upper portion or the lower portion further includes a first protruding portion to press the sealing member when the upper portion and the lower portion are engaged. In some embodiments, one of the upper portion or the lower portion further includes a second protruding portion to press the porous electrodes and the one or more porous separators when the upper portion and the lower portion are engaged. In some embodiments, a height of the second protruding portion is greater than a height of the first protruding portion.

In some embodiments, the connection portions of the porous electrodes extend outside of the case. In some embodiments, the connection portions of the porous electrodes have a thickness less than other portions of the porous electrodes. In some embodiments, at least two connection portions of the porous electrodes are connected to each other within the case. In some embodiments, the connection portions of the porous electrodes are separated by a material of the case. In some embodiments, edges of the one or more porous separators are entirely enclosed by the case.

In some embodiments, the case includes an upper portion to receive water and a lower portion to dispense the water. Each of the upper portion and the lower portion includes a plurality of through holes to allow the water to flow through. In some embodiments, the upper portion includes a wall extending upward to receive the water.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

DETAILED DESCRIPTION OF EMBODIMENTS

In the following description, certain specific details are set forth in order to provide a thorough understanding of various embodiments of the invention. However, one skilled in the art will understand that the invention may be practiced without these details. Moreover, while various embodiments of the invention are disclosed herein, many adaptations and modifications may be made within the scope of the invention in accordance with the common general knowledge of those skilled in this art. Such modifications include the substitution of known equivalents for any aspect of the invention in order to achieve the same result in substantially the same way.

Unless the context requires otherwise, throughout the present specification and claims, the word "comprise" and variations thereof, such as, "comprises" and "comprising" are to be construed in an open, inclusive sense, that is as "including, but not limited to." Recitation of numeric ranges of values throughout the specification is intended to serve as a shorthand notation of referring individually to each separate value falling within the range inclusive of the values defining the range, and each separate value is incorporated in the specification as it were individually recited herein. Additionally, the singular forms "a," "an" and "the" include plural referents unless the context clearly dictates otherwise.

Reference throughout this specification to "one embodiment" or "an embodiment" means that a particular feature, structure or characteristic described in connection with the embodiment is included in at least one embodiment of the present invention. Thus, the appearances of the phrases "in one embodiment" or "in an embodiment" in various places throughout this specification are not necessarily all referring to the same embodiment, but may be in some instances. Furthermore, the particular features, structures, or characteristics may be combined in any suitable manner in one or more embodiments.

Various embodiments described herein are directed to electrical water filter devices and components for making electrical water filter devices.

Figure 1:
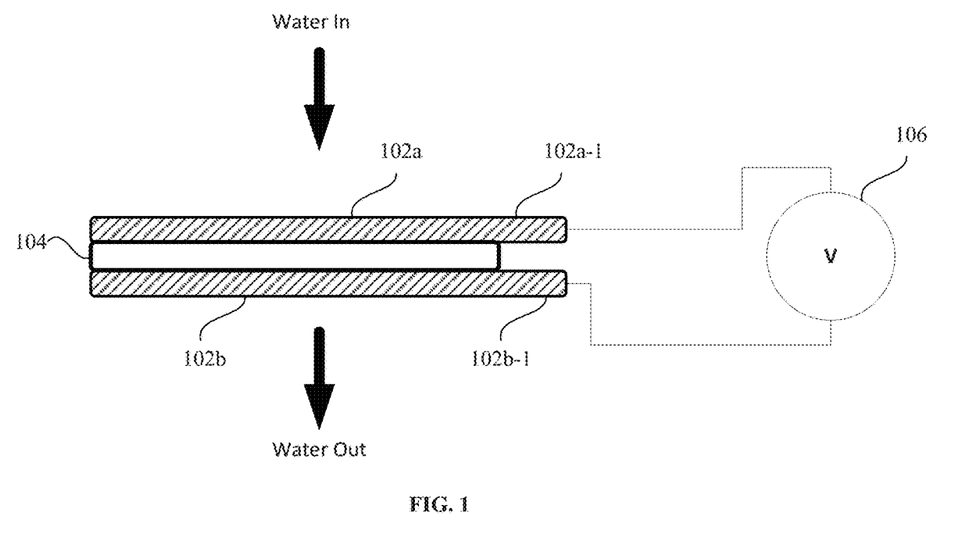
FIG. 1 is a schematic diagram illustrating an electrical water filter device, according to one example embodiment.

Embodiments will now be explained with accompanying figures. Reference is first made to FIG. 1. FIG. 1 is a schematic diagram illustrating an electrical water filter device 100, according to one example embodiment. The electrical water filter device 100 includes two porous electrodes 102a and 102b, a porous separator 104, and a power source 106. The porous separator 104 is interposed between the porous electrodes 102a and 102b. The porous separator 104 may include a porous polymer or mesh that provide insulation between two adjacent porous electrodes. The porous electrodes 102a and 102b include connection portions 102a-1 and 102b-1, respectively, for electrical connection to the power source 106. The connection portions 102a-1 and 102b-1 extend outside an edge of the porous separator 104.

In some embodiments, each of the porous electrodes 102a and 102b includes a porous body and nanostructures coupled to the porous support for sterilizing water. For example, the porous electrodes 102a and 102b may include macro porous conductive foams made of, e.g., copper, gold, nickel, palladium, platinum, silver, carbon, and other suitable metals or conductive materials. The nanostructures of the porous electrodes 102a and 102b may include nanowires or nanotubes formed on the conductive foams. The porous electrodes 102a and 102b are configured to include hydrophilic surfaces. In some embodiments, the connection portions 102a-1 and 102b-1 are made with the same material(s) and structure(s) as the main body of the porous electrodes 102a and 102b. In some embodiments, the porous electrodes 102a and 102b may have a thickness of 0.1-5 mm, 0.5-5 mm, or 0.5-2 mm. In some embodiments, the thickness of the porous electrodes 102a and 102b is about 1 mm.

In some embodiments, the porous separator 104 may include macro porous polymer (e.g., polyester). The porous separator 104 is configured to have high hydrophilicity and high permeability to water. In some embodiments, the porous separator 104 may have a thickness of 0.1-5 mm, 0.5-5 mm, or 0.5-2 mm. In some embodiments, the thickness of the porous separator 104 is about 0.3 mm.

The power source 106 is configured to provide power to the porous electrodes 102a and 102b. In one embodiment, the power source 106 supplies a first type of voltage to the porous electrode 102a, and supplies a second type of voltage to the porous electrode 102b. The second type is opposite to the first type. For example, the first type and the second type could be positive and negative, respectively, or vice versa. In some embodiments, a voltage difference between the first type of voltage and the second type of voltage is about 0 and to about 40 Volts or about 20 and to about 40 Volts. In some embodiments, the power source 106 provides a direct current or an alternating current to the porous electrodes. In some embodiments, the alternating current includes sine waves or square waves. In some embodiments, a frequency of the alternating current is at 0.01 to 10 Hz or at 0.5 to 1 Hz.

The water is received at the top porous electrode 102a and dispensed at the bottom porous electrode 102b. While the water is flowing through the electrical water filter device 100, the porous electrodes 102a and 102b and the porous separator 104 function to kill and trap the bacteria and other micro substances to provide water that is safe for drinking and other household and industrial applications.

Figure 2:
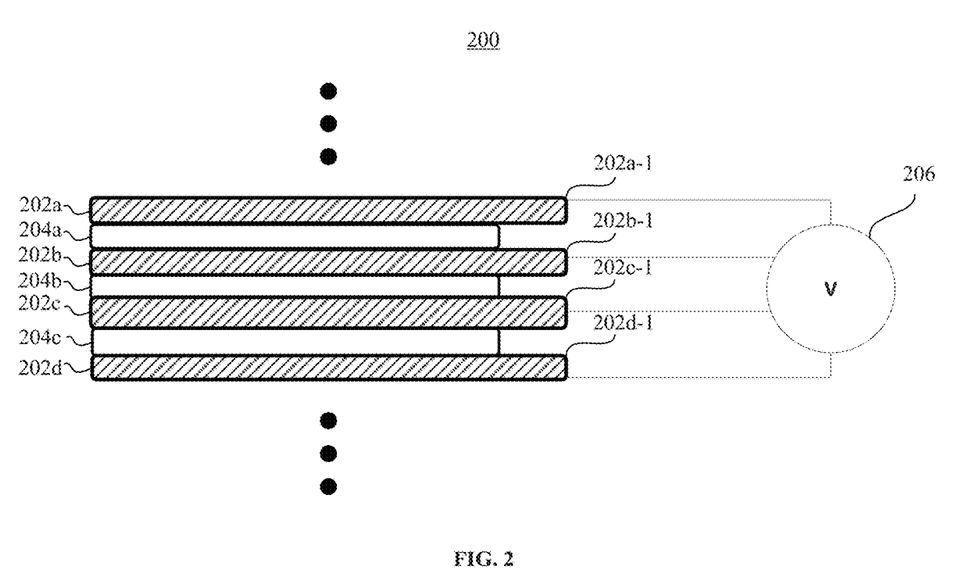
FIG. 2 is a schematic diagram illustrating another electrical water filter device, according to one example embodiment.

It is to be understood that an electrical water filter device can have any number of porous electrodes and one or more porous separators, as long as two adjacent porous electrodes are separated and insulated by a porous separator. For example, FIG. 2 shows another electrical water filter device 200 that has four porous electrodes 202a-d and three porous separators 204a-c. Each of the porous separators 204a-c is interposed between two adjacent porous electrodes. The porous electrodes 202a-d include connection portions 202a-1, 202b-1, 202c-1, and 202d-1 for connecting the porous electrodes 202a-d to a power source 206. Each of the connection portions 202a-1, 202b-1, 202c-1, and 202d-1 extends outside an edge of a respective porous separator next to a porous electrode.

Figure 3A:
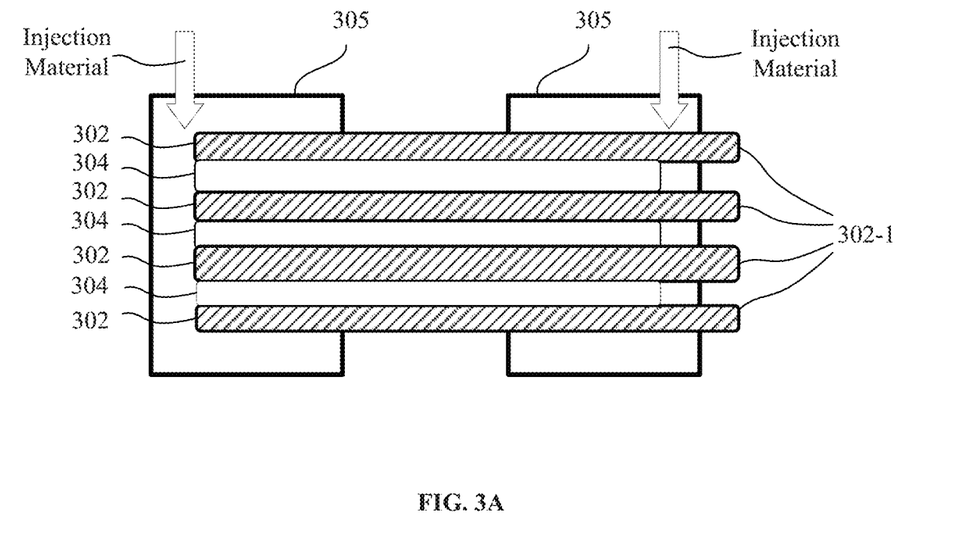
FIG. 3A is a schematic diagram illustrating using an insert molding technique to make an electrical water filter device, according to one example embodiment.
Figure 3B:
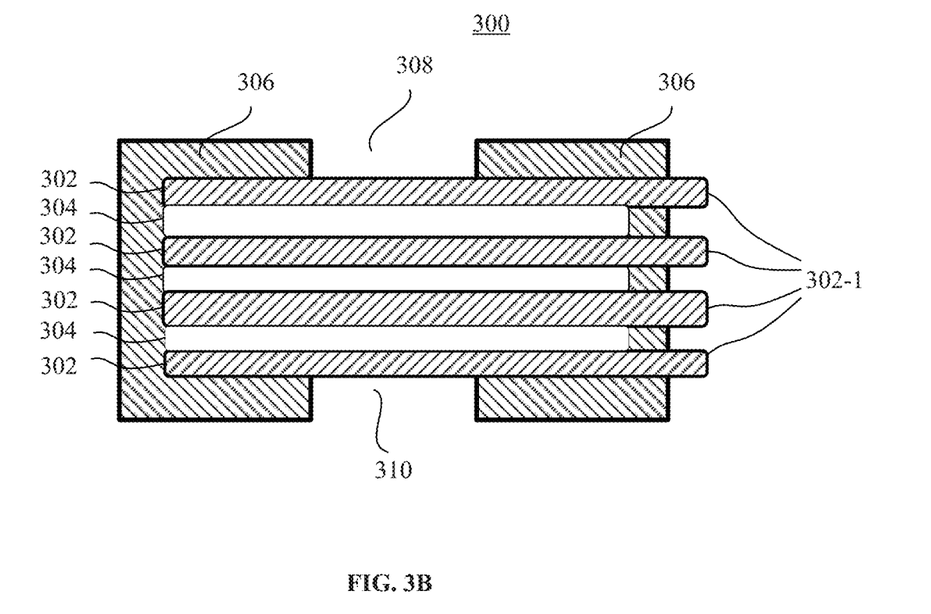
FIG. 3B is a schematic diagram illustrating another electrical water filter device, according to one example embodiment.

In some embodiments, an electrical water filter device may include a case surrounding porous electrodes and porous separators to fix the porous electrodes and the porous separators in the case. Reference is made to FIGS. 3A and 3B. FIG. 3A is a schematic diagram illustrating using an insert molding technique to make an electrical water filter device, according to one example embodiment. A stack of four porous electrodes 302 and three porous separators 304 is placed in a mold 305. A material for forming a case for the stack of porous electrodes and porous separators is then inserted in the mold 305, enclosing the stack except exposing a portion of the connection portions 302-1 of the porous electrodes. After the case for the electrical water filter device is formed, the mold 305 is removed. This method may be referred to as an insert molding.

FIG. 3B is a schematic diagram illustrating an electrical water filter device 300 manufactured by the insert molding method of FIG. 3A, according to one example embodiment. The electrical water filter device 300 includes four porous electrodes 302, three porous separators 304, and a case 306 that is formed using the mold 305 in FIG. 3A. Each of the porous separators 304 is interposed between two adjacent porous electrodes 302. Each of the connection portions 302-1 extends outside an edge of a respective porous separator 304. In some embodiments, The connection portions 302-1 of the porous electrodes 302 extend to the right, outside of the case 306 and connected to a power source.

The case 306 encloses the porous electrodes 302 and the porous separators 304 therein, except the extended connection portion 302-1 of the porous electrodes 302. The case 306 includes an upper opening 308 exposing a surface of the porous electrode 302 to receive water and a lower opening 310 to dispense the water. The upper opening 308 and the lower opening 310 of the case 306 allow the water to flow through the porous electrodes 302 and the porous separators 304. The connection portions 302-1 of the porous electrodes 302 may be separated and insulated from each other by a material of the case 306.

In some embodiments, the case 306 is configured to be water-proof or resistant to water, and durable. The material for the case 306 is configured to be safe for drinking water. For example, a material for the case 306 may include silicon, plastics (e.g., acrylonitrile butadiene styrene (ABS)), rubber, and other suitable materials. The case can be formed by injection molding or insert molding. For example, a mold is prepared for an insert molding process to form the case 306. Materials forming the case 306 is then inserted into the mold, with or without a stack of porous electrodes 302 and porous separators 304 inserted in the mold. In some embodiments, before, during, or after the rejection, the connection portion 302-1 of the porous electrodes 302 may be pressed or specifically formed so that the connection portions 302-1 of the porous electrodes 302 have a thickness less than other portions of the porous electrodes 302.

Figure 3C:
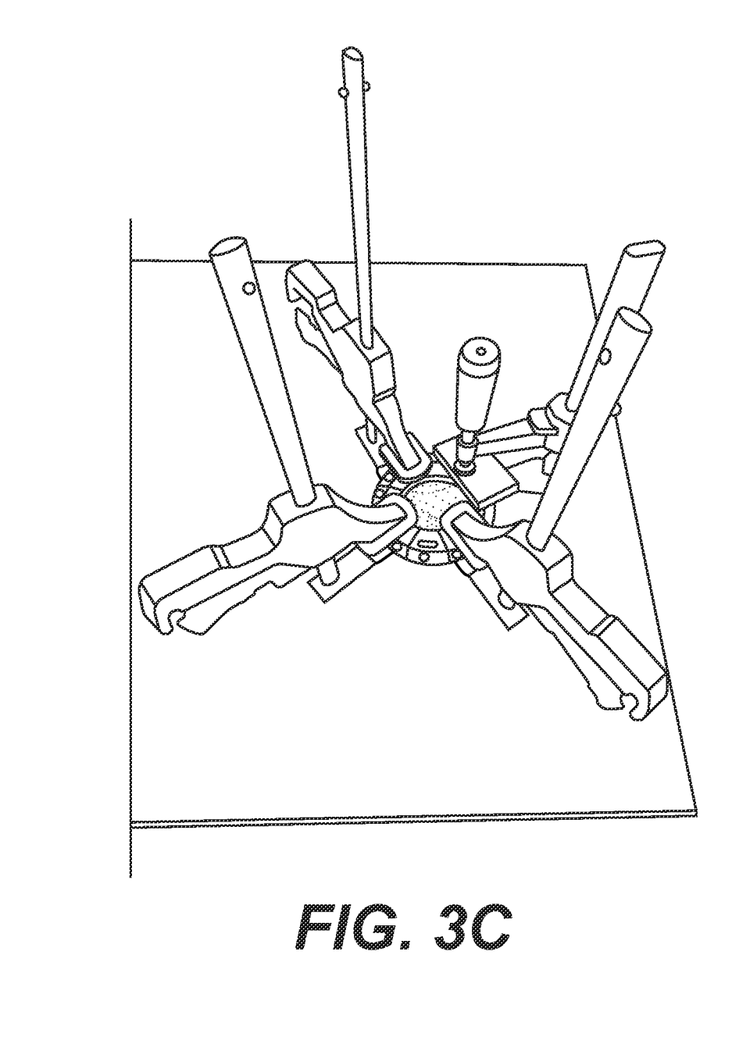
FIGS. 3C and 3D are pictures showing an insert molding process for forming a case for an electrical water filter device, according to one example embodiment.
Figure 3D:
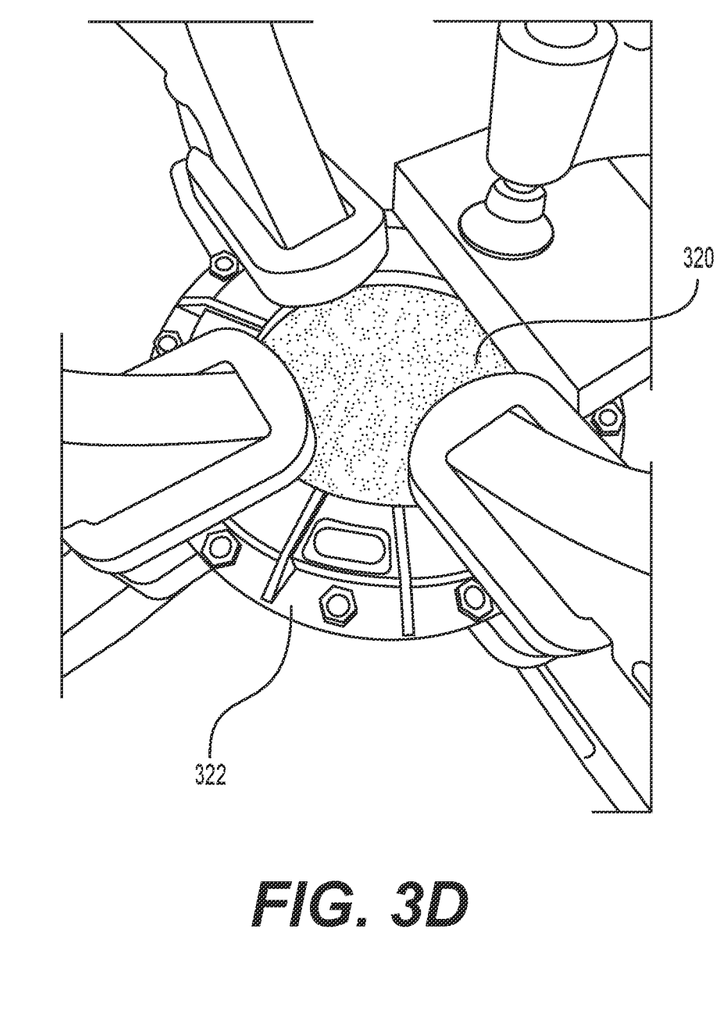
Figure 3E:
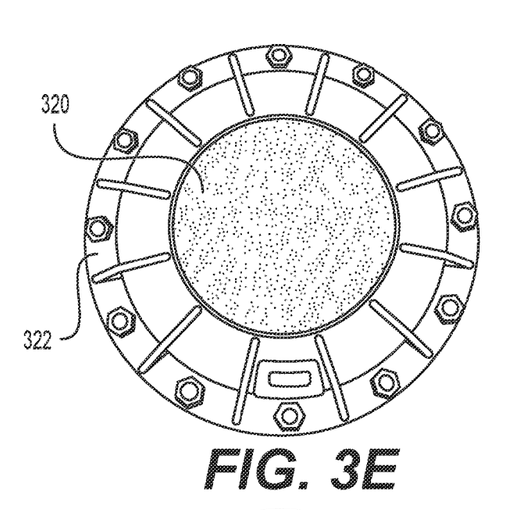
FIGS. 3E and 3F are pictures showing a top view and a bottom view, respectively, of an insertion mold having a stack inserted therein, according to one example embodiment.
Figure 3F:
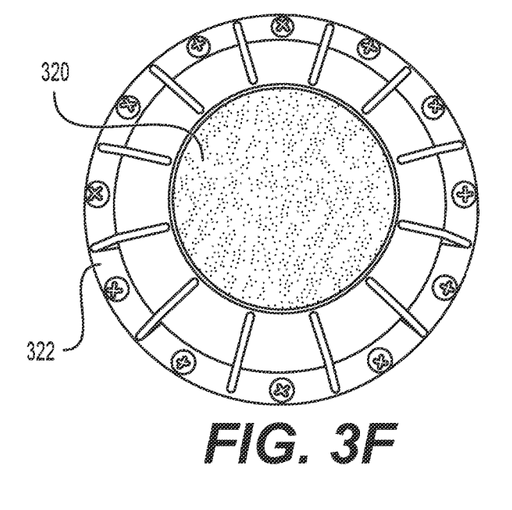
Figure 3G:
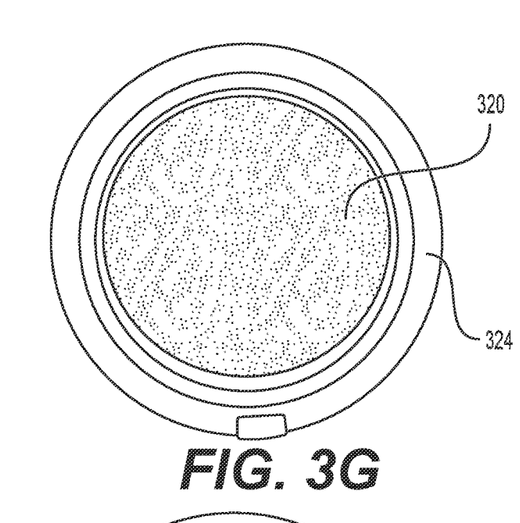
FIGS. 3G and 3H are pictures showing a top view and a bottom view, respectively, of a case enclosing a stack, according to one example embodiment.
Figure 3H:
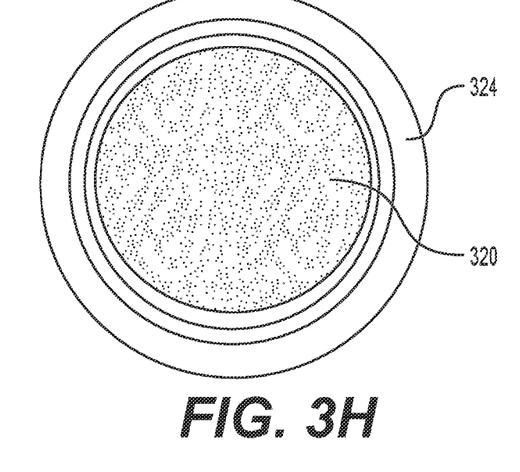

FIGS. 3C and 3D are pictures showing an insert molding process for forming a case for an electrical water filter device, according to one example embodiment. As shown in FIG. 3D, a stack 320 of porous electrodes and porous separators are placed in a mold 322. A material for forming a case is then inserted into the mold 322. FIGS. 3E and 3F are pictures showing a top view and a bottom view, respectively, of the mold 322 having the stack 320 inserted therein according to one example embodiment. FIGS. 3G and 3H are pictures showing a top view and a bottom view, respectively, of a case 324 enclosing the stack 320, according to one example embodiment. After the material for forming the case 324 is inserted into the mold 322, the material is cured at a suitable temperature. The mold 322 is then removed to expose the case 324 as shown in FIGS. 3G and 3H.

Figure 4A:
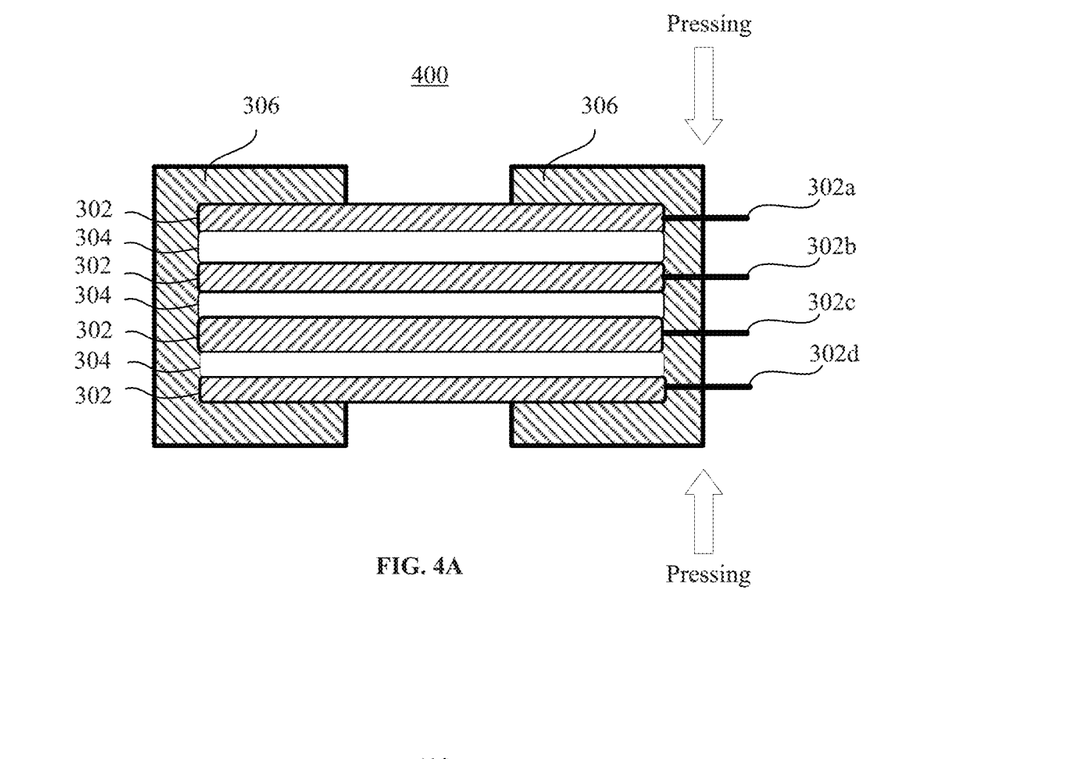
FIGS. 4A-4C are schematic diagrams illustrating some electrical water filter devices, according to example embodiments.
Figure 4B:
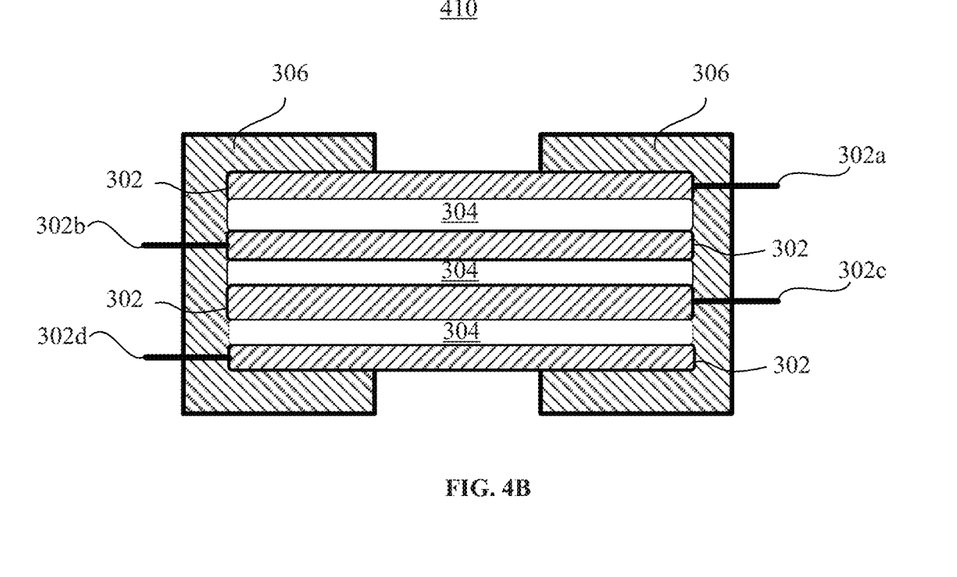
Figure 4C:
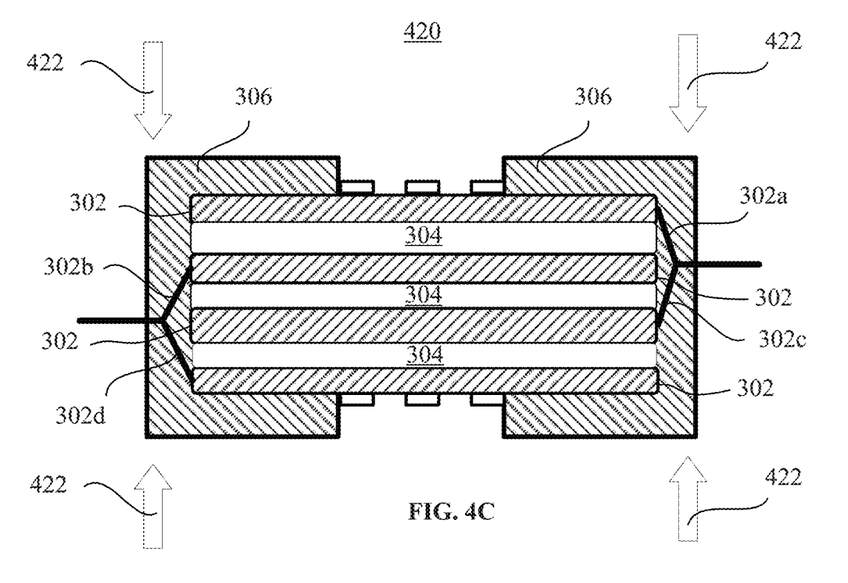

FIGS. 4A-4C are schematic diagrams illustrating some electrical water filter devices, according to example embodiments. FIG. 4A shows an electrical water filter device 400 that is similar to the electrical water filter device 300 in FIG. 3B except each of the connection portions 302a-d of the porous electrodes 302 has a thickness less than other portions of the porous electrodes 302. In some embodiments, the connection portions 302a-d are formed by pressing of the porous electrodes 302 and thus include the same material(s) as the porous electrodes 302. In some embodiments, the connection portions 302a-d may be a pre-manufactured part and attached to the porous electrodes 302 by welding, soldering, or other suitable methods. In some embodiments, the connection portions 302a-d may be made of materials that are conductive, resistant to water, and non-toxic. Example materials may include stainless steel, copper, gold, platinum, etc. Although not particularly limited, the shape of the connection portions 302a-d may be an electrode extension, a wire, a needle, a sheet, in bulk, or of a foam.

FIG. 4B shows another electrical water filter device 410 that is similar to the electrical water filter device 400 in FIG. 4A except the connection portions 302a and 302c are disposed to the right of the of the porous electrodes 302 and the connection portions 302b and 302d are disposed to the left of the of the porous electrodes 302. In some embodiments, the connection portions 302a and 302c may receive a same first voltage/current while the connection portions 302b and 302d may receive a same second voltage/current that is opposite to the first voltage/current of the connection portions 302a and 302c. This configuration may reduce wiring for the connection portions 302a-d and avoid short-circuiting between adjacent porous electrodes 302.

FIG. 4C shows another electrical water filter device 420 that is similar to the electrical water filter device 410 in FIG. 4A except the connection portions 302a and 302c are connected to each other within the case 306 and the connection portions 302b and 302d are connected to each other within the case 306. In some embodiments, the connection portions 302a and 302c may be connected to each other before the case is formed. In some embodiments, the connection portions 302a and 302c may be connected to each other in the process of forming the case 306, e.g., during an insert molding process. For example, after a material is injected to a mold to form the case 306, pressure 422 may be applied at the edges of the case 306 as shown in FIG. 4C. This configuration may also reduce wiring for the connection portions 302a-d and avoid short-circuiting between adjacent porous electrodes 302. Other methods for forming the connection portions 302a-d are contemplated.

Figure 5:
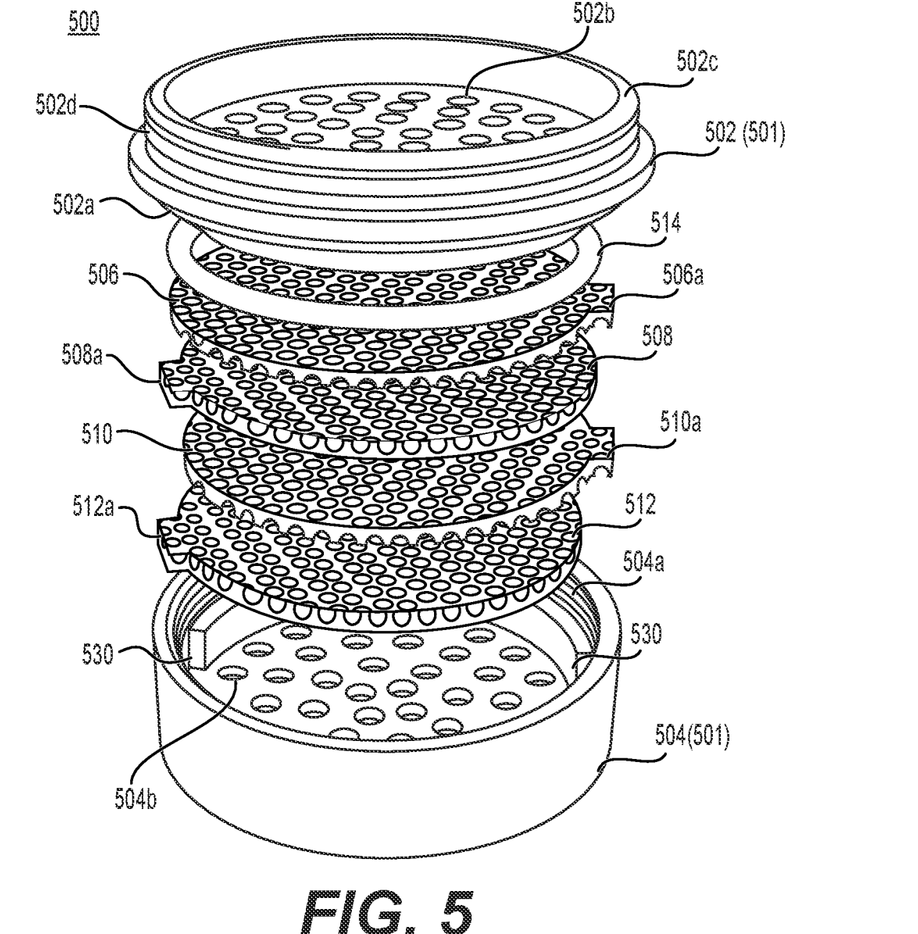
FIG. 5 is an exploded view of another electrical water filter device, according to one example embodiment.

FIG. 5 is an exploded view of another electrical water filter device 500, according to one example embodiment. The electrical water filter device 500 includes a case 501 having an upper portion 502 and a lower portion 504. A plurality of porous electrodes 506-512 and porous separators (not shown in FIG. 5) are disposed between the upper portion 502 and the lower portion 504. Although not shown in FIG. 5, each of the porous separators are interposed between two adjacent porous electrodes as configured in FIG. 1-4. The porous electrodes 506-512 include connection portions 506a, 508a, 510a, and 512a that are extended outside of edges of the porous separators.

In some embodiments, the upper portion 502 and the lower portion 504 include a fastening mechanism to fasten each other together. For example, the upper portion 502 and the lower portion 504 includes threads 502a and 504a that allows the upper portion 502 and the lower portion 504 to be threaded together.

The electrical water filter device 500 further includes a sealing member 514 interposed between the upper portion 502 and the lower portion 504. For example, the sealing member 514 may be an O-ring, a pod, or other sealing instruments that can prevent water from leaking out of the case 501.

The upper portion 502 and the lower portion 504 include a plurality of through holes 502b and 504b, respectively, to allow water to flow through the stake of porous electrodes 506-512 and porous separators.

Figure 6:
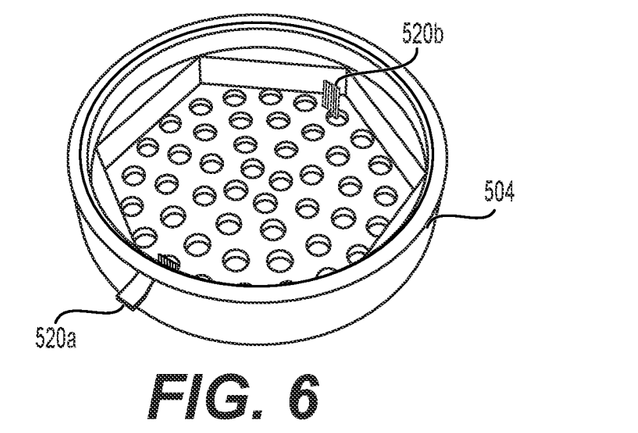
FIG. 6 is a perspective view of an example lower portion of the case in FIG. 5, according to one example embodiment.
Figure 7:
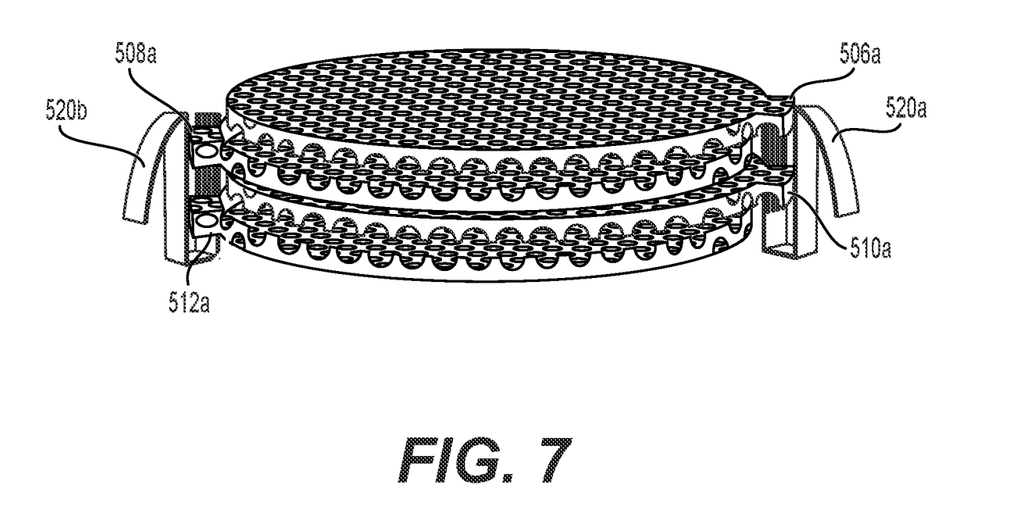
FIG. 7 is a perspective view illustrating connections between porous electrodes and electric connectors of a case, according to one example embodiment.
Figure 8:
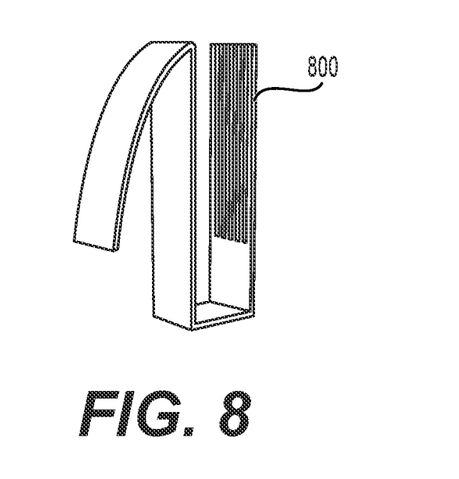
FIG. 8 is a perspective view illustrating an electric connector, according to one example embodiment.

In some embodiments, the case 501 may include an electric connector extending from an inside of the case 501 where the porous electrodes 506-512 and the porous separators are disposed to an outside of the case 501. An example is shown in FIG. 6. FIG. 6 is a perspective view of an example lower portion 504 of the case 501 in FIG. 5, according to one example embodiment. The lower portion 504 includes two electric connector 520a and 520b extending from an inside of the lower portion 504 to an outside of the of the lower portion 504. The electric connectors 520a and 520b are connected to the connection portions 506a, 508a, 510a, and 512a of the porous electrodes 506-512. FIG. 7 is a perspective view illustrating connections between porous electrodes and electric connectors of the case, according to one example embodiment. As shown in FIG. 7, the connection portions 506a and 510a are attached to the electric connector 520a while the connection portions 508a and 512a are attached to the electric connector 520b, which extend outside of the case 501 to connect to an external power source. FIG. 8 is a perspective view illustrating an electric connector 800, according to one example embodiment. The electric connector 800 may be any one of the electric connector 520a and 520b shown in FIGS. 6 and 7. The electric connector 800 may be in any shape to adapt the design of a case for an electrical water filter device. For example, the electric connector 800 may be sheet metal or other conductive materials that are resistant to water and non-toxic. Example materials for the electric connector 800 may include stainless steel, copper, gold, platinum, etc.

Referring back to FIG. 5, in some embodiments, at least one of the upper portion 502 or the lower portion 504 includes one or more ports 530 to receive the connection portions 506a, 508a, 510a, and 512a of the porous electrodes 506-512 and the electric connectors 520a and 520b of the case 501. In the illustrated embodiment, the ports 530 are recesses from the internal surface of the lower portion 504. However, this disclosure is not so limited; one or more ports may be located in the upper portion 502 of the case 501 or in both the upper portion 502 and the lower portion 504.

In some embodiments, the upper portion 502 of the case 501 further includes a wall 502c extending upward to receive water. In some embodiments, the wall 502c may include a connection mechanism 502d to securely connect to a water pipe/source to receive water. In the illustrated embodiment, the connection mechanism 502d is threads located on the outer surface of the wall 502c.

Figure 9A:
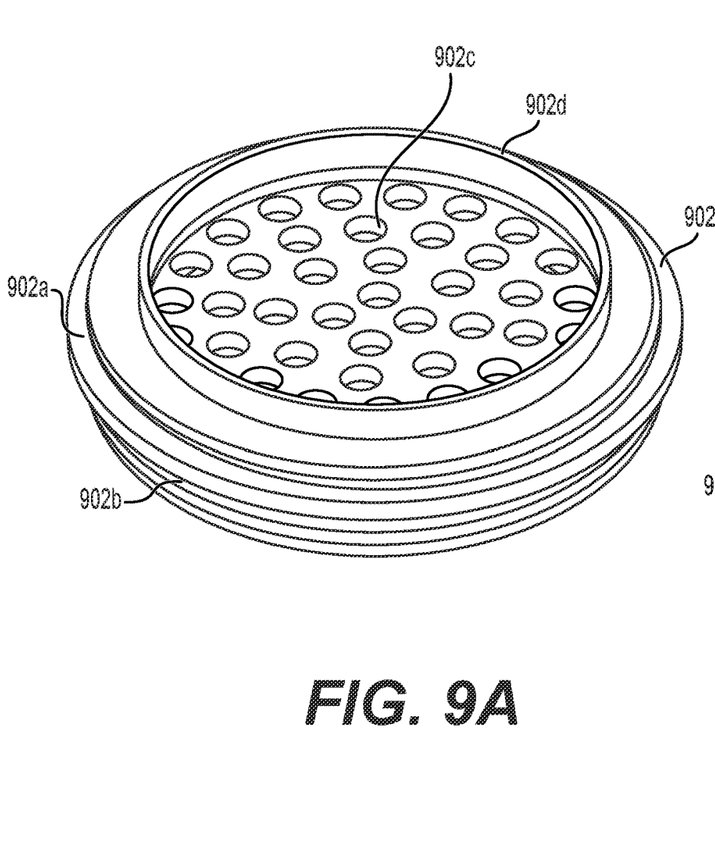
FIGS. 9A and 9B are perspective views illustrating an upper portion and a lower portion of a case for an electrical water filter device, according to one example embodiment.
Figure 9B:
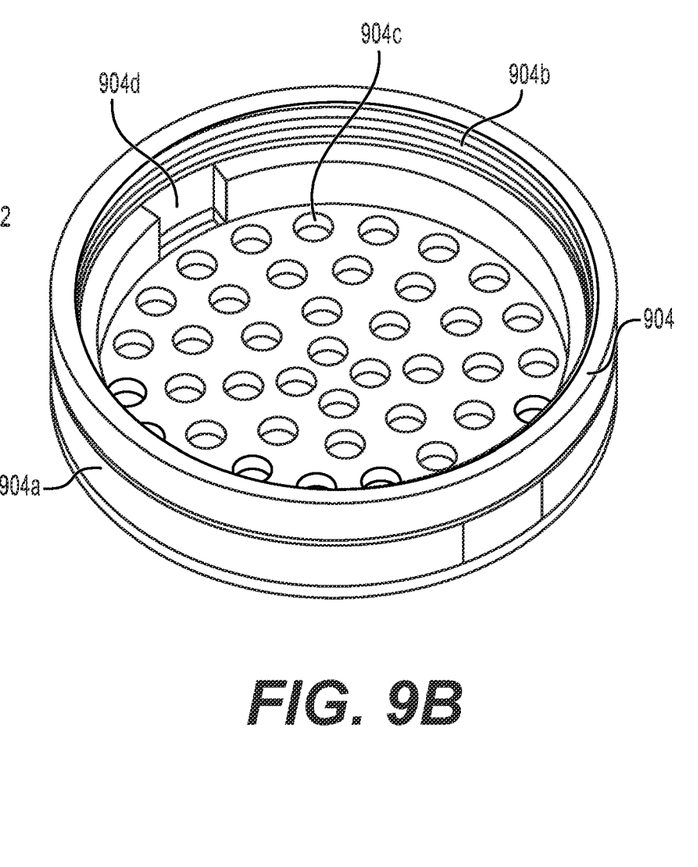

FIGS. 9A and 9B are perspective views illustrating an upper portion 902 and a lower portion 904 of a case for an electrical water filter device, according to one example embodiment. The upper portion 902 (FIG. 9A) includes a main body 902a, threads 902b formed on an outer side surface of the main body 902a, a plurality of through holes 902c formed on an upper surface of the main body 902a, and a wall 902d extending upward from the main body 902a. The lower portion 904 (FIG. 9B) includes a main body 904a, threads 904b formed on an inner side surface of the main body 904a, a plurality of through holes 904c formed on a lower surface of the main body 904a, and a port 904d that can communicate an inner portion of the lower portion 904 to an outside.

The threads 902b of the upper portion 902 are provided to engage with the threads 904b of the lower portion 904 to enclose a stack of porous electrodes and porous separators. The through holes 902c and 904c are provided to allow water to flow through the upper portion 902, the stack of porous electrodes and porous separators, and the lower portion 904. The wall 902d is provided to facilitate receipt of water and direct the water to flow through the stack of porous electrodes and porous separators. The port 904d is provided to receive connection portions of the porous electrodes and an electric connector that connects the porous electrodes to an external power source. It should be understood that various modifications to the configurations of the upper portion 902 and the lower portion 904 are contemplated. For example, the threads on the upper portion may be on an inner side surface while the threads on the lower portion 904 may be on an outer side surface. The port 904d may be formed on the upper portion 902 or on both of the upper portion 902 and the lower portion 904.

Figure 10A:
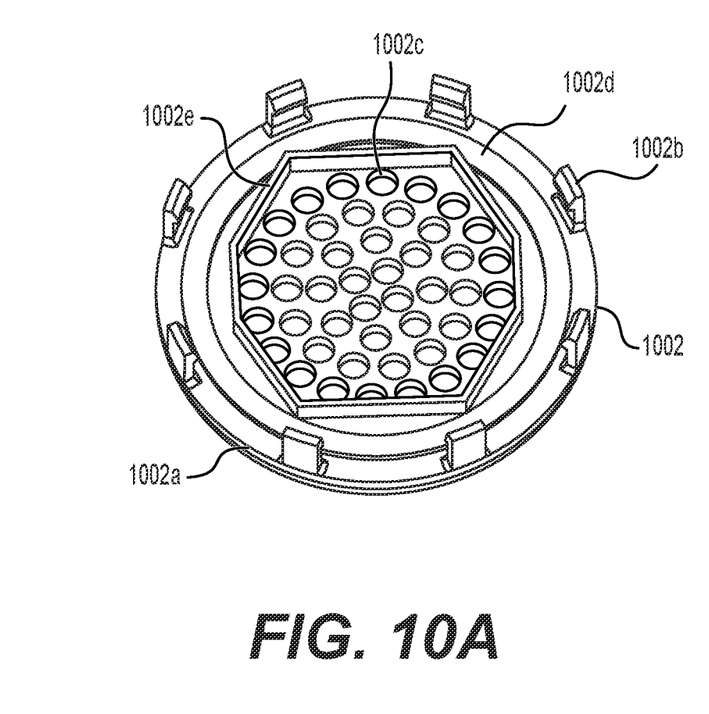
FIGS. 10A and 10B are perspective views illustrating an upper portion and a lower portion of a case for another electrical water filter device, according to one example embodiment.
Figure 10B:
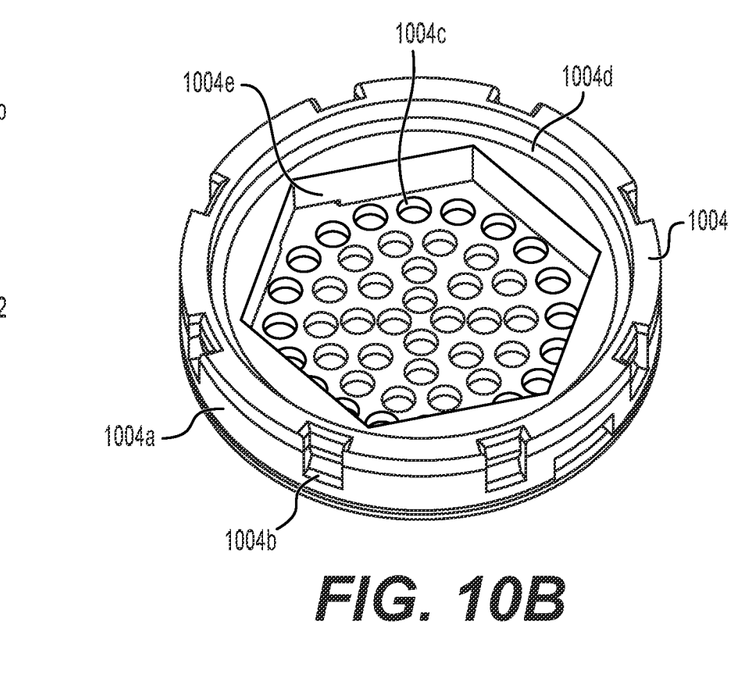

FIGS. 10A and 10B are perspective views illustrating an upper portion 1002 and a lower portion 1004 of a case for another electrical water filter device, according to one example embodiment. The upper portion 1002 (FIG. 10A) includes a main body 1002a, a plurality of buckles 1002b formed along the edge portion of the main body 1002a, a plurality of through holes 1002c formed on an upper surface of the main body 1002a, a first protruding portion 1002d, and a second protruding portion 1002e. The lower portion 1004 (FIG. 10B) includes a main body 1004a, a plurality of buckle receivers 1004b formed on the outer side surface of the main body 1004a, a plurality of through holes 1004c formed on a lower surface of the main body 1004a, a plateau portion 1004d, and a container 1004e.

The buckles 1002b are configured to snap with the buckle receivers 1004b to securely locking the upper portion 1002 with the lower portion 1004. The through holes 1002c and 1004c are provided to allow water to flow through the upper portion 1002, a stack of porous electrodes and porous separators disposed in the container 1004e, and the lower portion 1004. The first protruding portion 1002d and the plateau portion 1004d are provided to host a sealing member (e.g., an O-ring). When the upper portion 1002 and the lower portion 1004 are engaged via the buckles 1002b and the buckle receivers 1004b, the first protruding portion 1002d presses the sealing member on the plateau portion 1004d to prevent water from leaking therebetween. The second protruding portion 1002e is configured to fit into the container 1004e. When the upper portion 1002 and the lower portion 1004 are engaged, the second protruding portion 1002e presses the stack of the porous electrodes and the porous separators against the lower portion 1004. The second protruding portion 1004e may further secure the porous electrodes and the porous separators in the container 1004e. In some embodiments, to be effective for their respective purposes, a height of the second protruding portion 1002e is configured to be greater than a height of the first protruding portion 1002d.

It should be understood that various modifications to the configurations of the upper portion 1002 and the lower portion 1004 are contemplated. For example, the buckles may be formed on the lower portion 1004 while the buckle receives may be formed on the upper portion 1002. Similarly, the first protruding portion and the second protruding portion may be formed on the lower portion 1004 while the plateau portion and the container may be formed on the upper portion 1002.

Figure 11A:
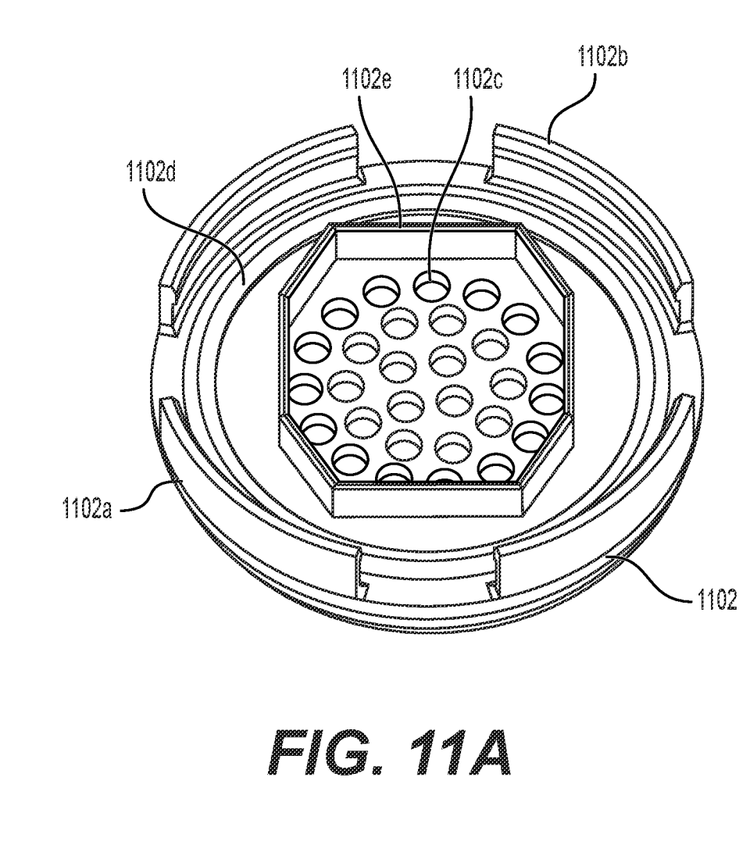
FIGS. 11A and 11B are perspective views illustrating an upper portion and a lower portion of a case for another electrical water filter device, according to one example embodiment.
Figure 11B:
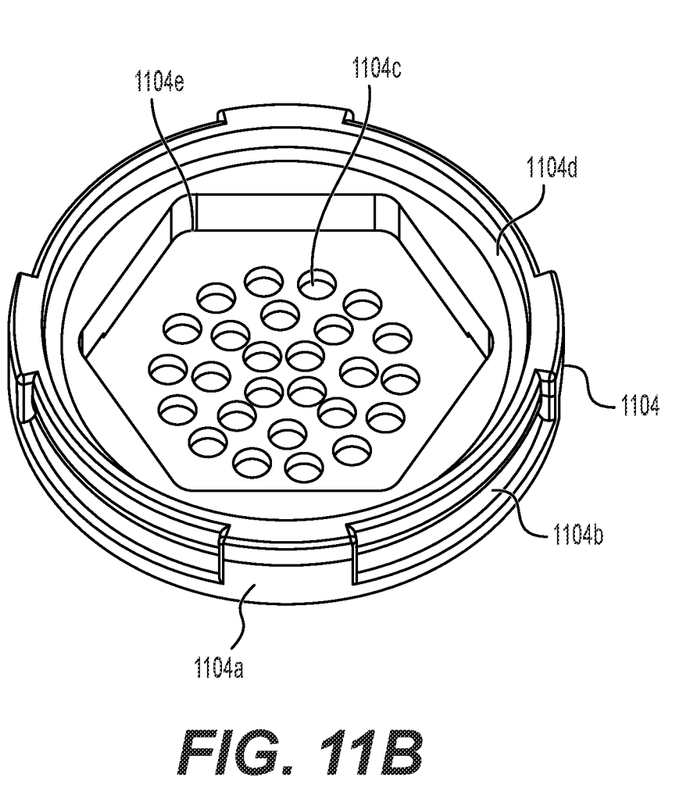

FIGS. 11A and 11B are perspective views illustrating an upper portion 1102 and a lower portion 1104 of a case for another electrical water filter device, according to one example embodiment. The upper portion 1102 (FIG. 11A) includes a main body 1102a, a plurality of buckles 1102b formed along the edge portion of the main body 1102a, a plurality of through holes 1102c formed on an upper surface of the main body 1102a, a first protruding portion 1102d, and a second protruding portion 1102e. The lower portion 1104 (FIG. 11B) includes a main body 1104a, a plurality of buckle receivers 1104b formed on the outer side surface of the main body 1104a, a plurality of through holes 1104c formed on a lower surface of the main body 1104a, a plateau portion 1104d, and a container 1104e. As shown in FIGS. 11A and 11B, the structures and functions of the upper portion 1102 and the lower portion 1104 are similar to those of the upper portion 1002 and the lower portion 1004 of FIGS. 10A and 10B, except the buckles 1102b and corresponding buckle receives 1104b are wider and stronger than the buckles 1002b and corresponding buckle receives 1004b. The buckles 1102b and the buckle receives 1104b could more reliably secure the upper portion 1102 to the lower portion 1104.

Figure 12A:
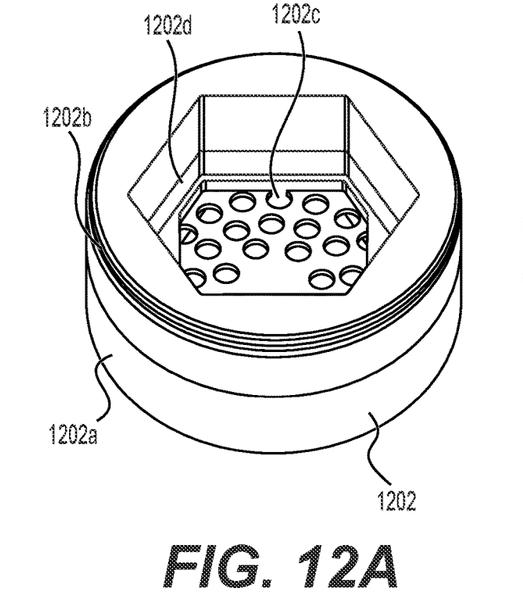
FIGS. 12A and 12B are perspective views illustrating interior structures of an upper portion and a lower portion of a case for another electrical water filter device, according to one example embodiment.
Figure 12B:
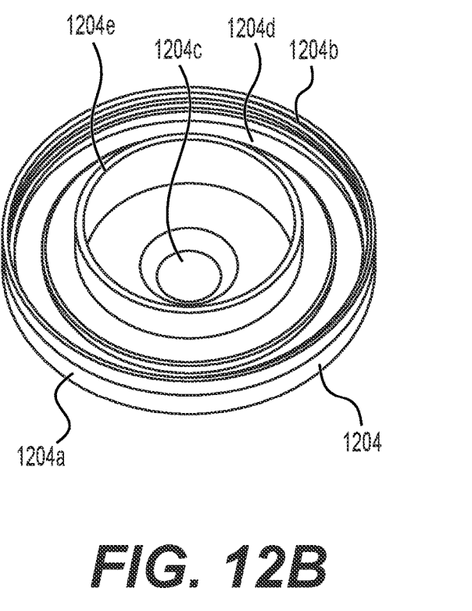

FIGS. 12A and 12B are perspective views illustrating interior structures of an upper portion 1202 and a lower portion 1204 of a case for another electrical water filter device, according to one example embodiment. The upper portion 1202 (FIG. 12A) includes a main body 1202a, a plurality of threads 1202b formed on an outer side surface of the main body 1202a, a plurality of through holes 1202c formed on an inner surface of the main body 1202a, and a container 1202d. The lower portion 1204 (FIG. 12B) includes a main body 1204a, a plurality of threads formed on inner side surface of the main body 1204a, a water outlet 1204c formed in a lower portion of the main body 1204a, a trench portion 1204d, and a protruding portion 1204e. The threads 1202b of the upper portion 1202 are provided to engage with the threads 1204b of the lower portion 1204 to enclose a stack of porous electrodes and porous separators in the container 1202d. A sealing member can be placed in the trench portion 1204d to prevent water leakage when the upper portion 1202 and the lower portion 1204 are engaged. The protruding portion 1204e presses the stack of the porous electrodes and the porous separators against the upper portion 1202 when the upper portion 1202 and the lower portion 1204 are engaged. The through holes 1202c are arranged to spread out the area of the container 1202d to evenly direct water into the stack of porous electrodes and the porous separators.

Figure 12C:
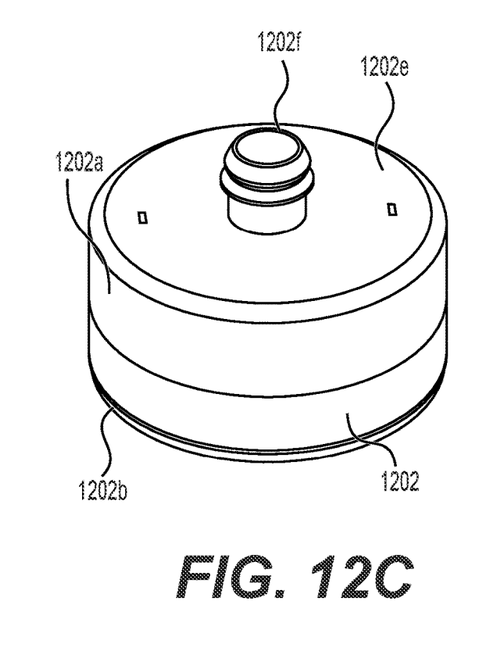
FIGS. 12C and 12D are perspective views illustrating exterior structures of the upper portion in FIG. 12A and the lower portion in FIG. 12B, respectively.
Figure 12D:
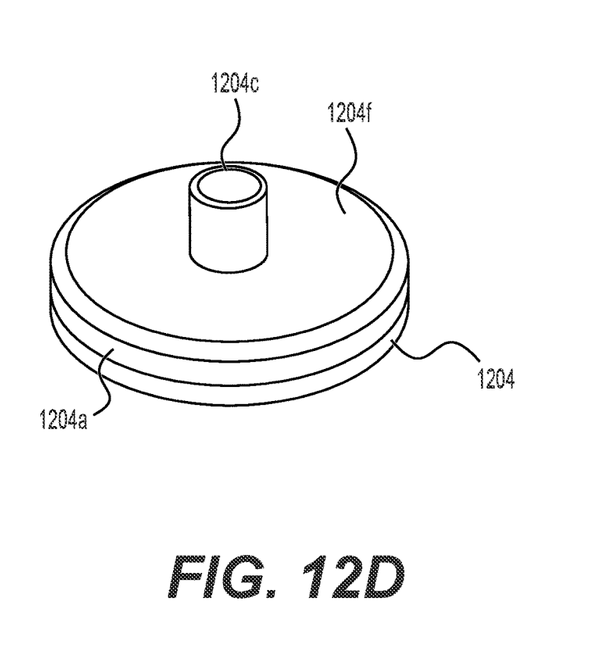

FIGS. 12C and 12D are perspective views illustrating exterior structures of the upper portion 1202 in FIG. 12A and the lower portion 1202 in FIG. 12B, respectively. The upper portion 1202 (FIG. 12C) further includes an upper cover portion 1202e and a water inlet 1202f. The lower portion 1204 (FIG. 12D) further includes a lower cover 1204f. The water outlet 1204c is also visible in FIG. 12D. Water for filtering is received at the water inlet 1202f and discharged from the water outlet 1204c after flowing through the stack of the porous electrodes and the porous separators.

Figure 13:
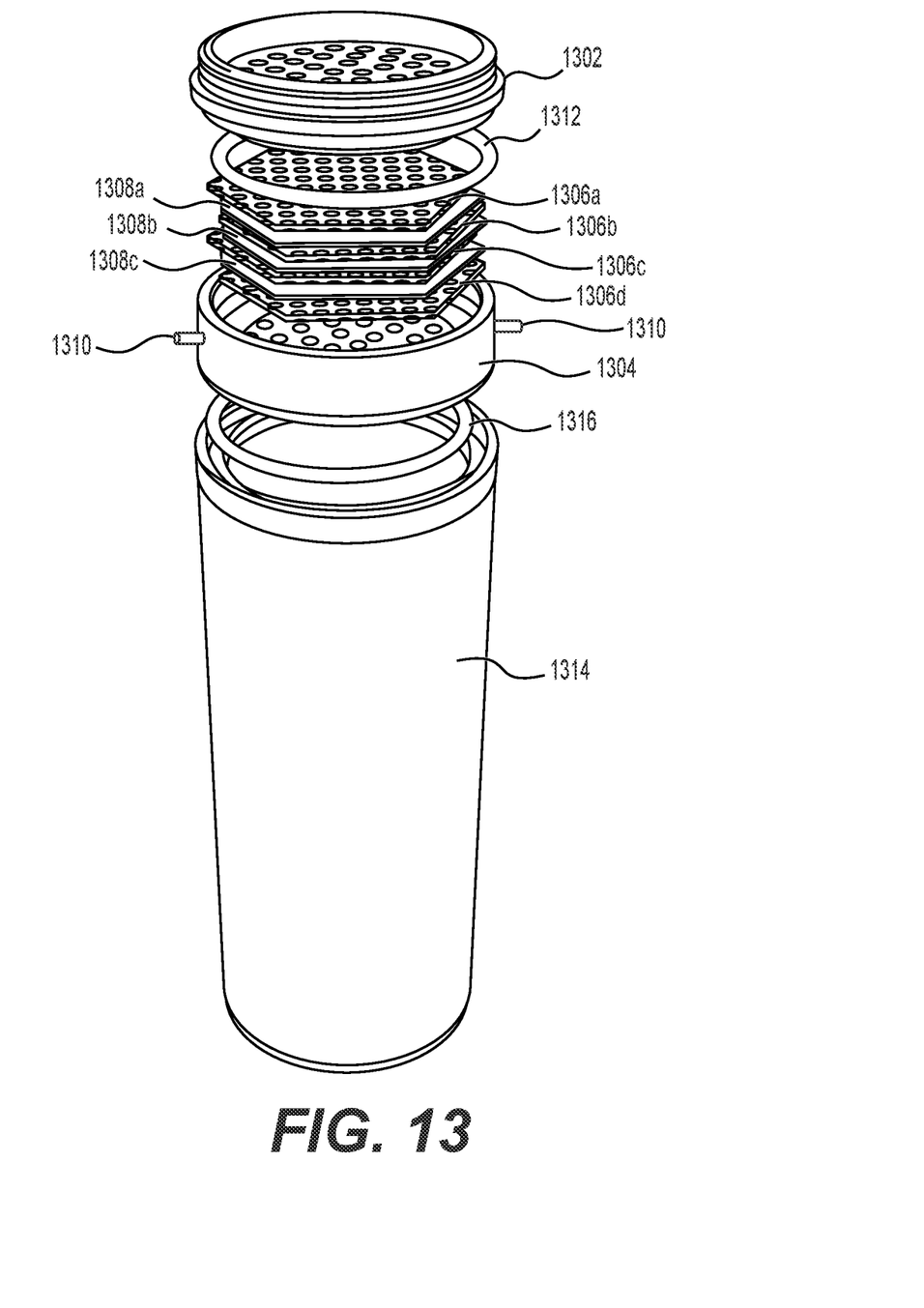
FIG. 13 is an exploded view of an electrical water filter device, according to one example embodiment.

FIG. 13 is an exploded view of another electrical water filter device 1300, according to one example embodiment. The electrical water filter device 1300 includes an upper cap portion 1302 and a lower container portion 1304, which define a space for storing a plurality porous electrodes and one or more porous separators. As shown in FIG. 13, the electrical water filter device 1300 includes four porous electrodes 1306a-d and three porous separators 1308a-c. Each of the porous separators 1308a-c is interposed between two adjacent porous electrodes 1306 to electrically separate the adjacent porous electrodes. The porous electrodes 1306a-d include connections portion that are connected to electric connectors 1310 disposed in the lower container portion 1304. The electric connectors 1310 are configured to extend from an inside of the lower container portion 1304 to an outside of the lower container portion 1304, and are connected to a power source. The electrical water filter device 1300 further includes a first O-ring 1312 disposed between the upper cap portion 1302 and the lower container portion 1304 to prevent water leakage. The electrical water filter device 1300 also includes a clean-water storage/container 1314 to store water filtered through the porous electrodes 1306a-d and the porous separators 1308a-c. A second O-ring 1316 is interposed between the lower container portion 1304 and the clean-water storage/container 1314 to prevent water leakage. It is to be understood that any number of porous electrodes and porous separators may be included in the electrical water filter device 1300 based on needs and water qualities.

The techniques disclosed herein allow the electrical water filter devices to be assembled without using glue as glue may contaminate the filtered water. Further, the electrical water filter devices are configured so that the parts are assembled with easy fastening mechanisms and connections. Also, the electrical water filter devices are secured with no water leakage.

In some embodiments, when a case for an electrical water filter device includes an upper portion and a lower portion to enclose porous electrodes and porous separators, the upper portion and the lower portion may be adhered by ultrasound welding. In some embodiments, the upper portion and the lower portion may be adhered with a non-toxic adhesive.

The foregoing description of the present invention has been provided for the purposes of illustration and description. It is not intended to be exhaustive or to limit the invention to the precise forms disclosed. The breadth and scope of the present invention should not be limited by any of the above-described exemplary embodiments. Many modifications and variations will be apparent to the practitioner skilled in the art. The modifications and variations include any relevant combination of the disclosed features. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. An electrical water filter device, comprising:
a plurality of porous electrodes;
one or more porous separators, each of the one or more porous separators being interposed between two adjacent porous electrodes; and
a case surrounding the porous electrodes and the one or more porous separators to fix the porous electrodes and the one or more porous separators in the case, wherein the case includes an upper portion to receive water, a lower portion to dispense the water, and a sealing member interposed between the upper portion and the lower portion,
wherein each of the porous electrodes includes a connection portion extending outside an edge of the one or more separators,
wherein the case includes an electric connector having a first end portion extending from an inner surface of the case to an inside of the case where the porous electrodes and the one or more porous separators are disposed and a second end portion extending from an external surface of the case to an outside of the case, wherein the electric connector is connected to the connection portions of the porous electrodes,
wherein the upper portion includes a base portion, a first protruding portion protruding from the base portion toward the lower portion, and a second protruding portion protruding from the based portion toward the lower portion, wherein a height of the second protruding portion is greater than a height of the first protruding portion, and
wherein when the upper portion and the lower portion are engaged to and in contact with each other, the first protruding portion presses against the sealing member and the second protruding portion presses against one of the porous electrodes and the one or more porous separators.

2. The electrical water filter device of claim 1, wherein the first end portion of the electric connector is extended in a first direction, and the second end portion of the electric connector is extended in a second direction different from the first portion.

3. The electrical water filter device of claim 2, wherein at least one of the upper portion or the lower portion includes a port to receive at least one of the connection portions of the porous electrodes and the electric connector of the case.

4. The electrical water filter device of claim 3, wherein the upper portion and the lower portion include a fastening mechanism to fasten each other together.

5. The electrical water filter device of claim 4, wherein the fastening mechanism includes threads on the upper portion and the lower portion.

6. The electrical water filter device of claim 4, wherein the fastening mechanism includes one or more snap buckles and one or more buckle receivers to engage the upper portion to the lower portion.

7. The electrical water filter device of claim 3, wherein each of the upper portion and the lower portion includes a plurality of through holes to allow water to flow through.

8. The electrical water filter device of claim 7, wherein the upper portion of the case includes a wall extending upward to receive the water.

9. An electrical water filter device comprising:
a plurality of porous electrodes;
one or more porous separators, each of the one or more porous separators being interposed between two adjacent porous electrodes; and
a case surrounding the porous electrodes and the one or more porous separators to fix the porous electrodes and the one or more porous separators in the case, wherein the case includes an upper portion to receive water, a lower portion to dispense the water, and a sealing member interposed between the upper portion and the lower portion,
wherein each of the porous electrodes includes a connection portion extending outside an edge of the one or more porous separators;
wherein at least one of the connection portions of the porous electrodes extends outside of the case;
wherein the upper portion includes a base portion, a first protruding portion protruding from the base portion toward the lower portion, and a second protruding portion protruding from the based portion toward the lower portion, wherein a height of the second protruding portion is greater than a height of the first protruding portion; and
wherein when the upper portion and the lower portion are engaged to and in contact with each other, the first protruding portion presses against the sealing member and the second protruding portion presses against one of the porous electrodes and the one or more porous separators.

10. The electrical water filter device of claim 9, wherein the connection portions of the porous electrodes have a thickness less than other portions of the porous electrodes.

11. The electrical water filter device of claim 9, wherein at least two connection portions of the porous electrodes are connected to each other within the side wall of the case.

12. The electrical water filter device of claim 9, wherein the connection portions of the porous electrodes are separated by a material of the case.

13. The electrical water filter device of claim 9, wherein each of the upper portion and the lower portion includes a plurality of through holes to allow the water to flow through.

14. The electrical water filter device of claim 13, wherein the upper portion includes a wall extending upward to receive the water.

* * * * *